(12) United States Patent
Schalyo et al.

(10) Patent No.: US 11,536,074 B2
(45) Date of Patent: Dec. 27, 2022

(54) FLAP ARRANGEMENT WITH A FLAP FOR A MOTOR VEHICLE

(71) Applicant: Brose Fahrzeugteile SE & Co. Kommanditgesellschaft, Bamberg, Bamberg (DE)

(72) Inventors: Heino Schalyo, Altendorf (DE); Christoph Haberberger, Gößweinstein (DE); Vitali Wendland, Bamberg (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 217 days.

(21) Appl. No.: 16/869,868

(22) Filed: May 8, 2020

(65) Prior Publication Data

US 2021/0348433 A1 Nov. 11, 2021

(51) Int. Cl.
*E05F 15/00* (2015.01)
*E05F 15/614* (2015.01)
*B60J 5/10* (2006.01)
*B62D 33/027* (2006.01)

(52) U.S. Cl.
CPC ............ *E05F 15/614* (2015.01); *B60J 5/108* (2013.01); *B62D 33/0273* (2013.01); *E05Y 2201/434* (2013.01); *E05Y 2201/638* (2013.01); *E05Y 2201/706* (2013.01); *E05Y 2201/71* (2013.01); *E05Y 2900/546* (2013.01)

(58) Field of Classification Search
CPC ...... E05D 11/08; E05F 15/627; E05F 15/614; B60J 5/108; B62D 33/0273; B62D 33/03; E05Y 2201/702; E05Y 2201/434; E05Y 2201/704; E05Y 2201/706; E05Y 2201/266; E05Y 2201/638; E05Y 2201/654; E05Y 2201/71; E05Y 2900/544; E05Y 2900/546
See application file for complete search history.

(56) References Cited

U.S. PATENT DOCUMENTS

| | | | |
|---|---|---|---|
| 6,994,363 B2 * | 2/2006 | Seksaria | B60P 3/40 280/166 |
| 10,022,016 B1 * | 7/2018 | Streett | A47J 37/0763 |
| 10,077,083 B1 * | 9/2018 | Survis | B62D 33/0273 |
| 10,293,868 B2 | 5/2019 | Jergess | |
| 10,494,037 B2 * | 12/2019 | Williams | B60P 7/08 |
| 10,920,472 B2 | 2/2021 | Trentin | |
| 11,111,710 B2 | 9/2021 | Ulewicz | |

(Continued)

*Primary Examiner* — Chi Q Nguyen
(74) *Attorney, Agent, or Firm* — Brooks Kushman, P.C.

(57) ABSTRACT

A drive arrangement configured to pivot a tailgate pivotally coupled to a vehicle body, between an open position and a closed position and including a freewheel mechanism, a drive shaft, and a motor. The freewheel mechanism may be rotatably coupled to the vehicle body and defining an opening provided with an inner periphery that includes a first cam element and a second cam element. The drive shaft may be fixed to the vehicle body and extending into the opening. The drive shaft may define an outer periphery that includes a third cam element and a fourth cam element. A motor may be coupled to the freewheel mechanism and may be configured to rotate the freewheel mechanism so that the first cam element engages the third cam element to pivot the tailgate from the closed position towards the open position.

20 Claims, 4 Drawing Sheets

(56) References Cited

U.S. PATENT DOCUMENTS

| | | | |
|---|---|---|---|
| 2004/0124662 A1* | 7/2004 | Cleland | E05F 1/1091 |
| | | | 296/146.4 |
| 2009/0302630 A1 | 12/2009 | Duffy | |
| 2013/0278004 A1 | 10/2013 | Sackett | |
| 2014/0324251 A1* | 10/2014 | Hansen | E05F 15/63 |
| | | | 296/57.1 |
| 2016/0222708 A1 | 8/2016 | Higgins | |
| 2017/0089112 A1 | 3/2017 | Rosales et al. | |
| 2017/0274869 A1 | 9/2017 | Da Deppo | |
| 2018/0251164 A1 | 9/2018 | Jergess | |
| 2019/0211598 A1 | 7/2019 | Hemphill | |
| 2020/0040628 A1 | 2/2020 | Trentin | |
| 2020/0047821 A1 | 2/2020 | Santana | |
| 2020/0123816 A1* | 4/2020 | Taylor | E05B 79/20 |
| 2020/0399943 A1 | 12/2020 | Ulewicz | |
| 2021/0155297 A1* | 5/2021 | Lakerdas | E05F 1/1008 |
| 2021/0347416 A1* | 11/2021 | Schalyo | E05F 1/1075 |
| 2021/0371017 A1* | 12/2021 | Heins | E05F 15/63 |
| 2022/0003025 A1* | 1/2022 | Scholz | E05B 81/34 |
| 2022/0032854 A1* | 2/2022 | Burke | B60R 9/10 |

* cited by examiner

FLAP ARRANGEMENT WITH A FLAP FOR A MOTOR VEHICLE

TECHNICAL FIELD

The present disclosure relates to a flap arrangement for a motor vehicle.

BACKGROUND

Vehicles may include one or more flaps. The flap may be any kind of flap, such as a closing element, of a motor vehicle. The flap may be a tailgate, a liftgate, a trunk lid, a back door, a front hood, a side door or the like. All those flaps are pivotable about flap pivot axis and can be adjusted between an open position and a closed position over a pivot angle.

SUMMARY

One or more objects of the present disclosure may be to provide a flap arrangement for a motor vehicle which is actuable by a motor and by hand easily while providing a cost-efficient assembly.

According to one or more embodiments, a drive arrangement of a flap arrangement is provided. The drive arrangement may include a freewheel mechanism that includes a drive component with at least one force transmitting element and a driven component with at least one force receiving element. Interacting with each other, the transmitting element and the receiving element, transmit driving forces of the motor to the flap. By designing the freewheel mechanism in such a manner that in a neutral position of the transmitting element a manual movement of the flap and the receiving element respectively is possible without displacing the transmitting element, it is possible to freely move the flap by hand. During the motorized and the manual movement, the receiving element is displaced along a single displacement path enabling an easy structure of the freewheel mechanism.

In detail, it is proposed that the drive train includes a freewheel mechanism, that the freewheel mechanism includes a drive component, in particular a driveshaft, with at least one force transmitting element, and a driven component, in particular a driven shaft, with at least one force receiving element assigned to a respective transmitting element, that during a motorized movement of the flap from its closed to its open position and/or from its open to its closed position over at least part of the pivot angle the motor by actuating, in particular rotating, the drive component displaces the transmitting element together with the receiving element along a displacement path, said motorized movement of the transmitting element starting from a neutral position, that after the motorized movement of the flap the transmitting element can be displaced back to the neutral position independent of the flap, that, when the transmitting element is in the neutral position, during a manual movement of the flap from its closed to its open position and/or from its open to its closed position over at least part of the pivot angle the flap by actuating, in particular rotating, the driven component displaces the receiving element along the displacement path in direction of the neutral position of the force transmitting element without displacing, in particular without engaging, the transmitting element.

The motorized and the manual movement may be opening or closing movements of the flap, such as over the complete pivot angle of the flap.

The displacement path may be circular.

The neutral position may be a load-free position. In this way, a stable freewheel mechanism easily allowing a manual and motorized movement can be reached.

In one or more embodiments, one of these elements may be a disc shaped element, and the other one may be a hollow disc shaped element according to claim 10. They may comprise cams providing contours for transmitting the driving forces according to claim 11. They may also define an open space for respective other cams making a simple freewheel mechanism with few parts.

In one or more embodiments the receiving element may move over a freewheel angle during the movement of the flap which directly relates to the pivot angle and may even be equal to the pivot angle.

In one or more embodiments, the flap arrangement may further comprise a spring arrangement with a spring generating driving forces which in one or more embodiments are balanced such that the flap may remain at least in an open position or a closed position without movement.

BRIEF DESCRIPTION OF THE DRAWINGS

In the following, an exemplary embodiment of the invention is explained with respect to drawings. In the drawings

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The flap arrangement (US 2017/0089112 A1), which is the starting point of the invention, is a downwardly opening flap of a pick-up truck. The flap has a drive arrangement for motorized adjustment the flap between an open position and a closed position in either direction. The drive arrangement includes a motor and a drive train for transmitting the driving forces of the motor to the flap.

While the known flap arrangement works well for motorized adjustment of the flap, many users require the flap to be openable and closeable manually. There are known coupling arrangements allowing flaps to be moved by hand, by decoupling the drive train between the flap and the motor. However, these couplings are usually complex assemblies. Additionally, many of them require the user to move the flap with a minimum force and do not allow exceeding a maximum force or speed of movement of the flap. In particular flaps of pick-up trucks are often opened and closed manually fast due to the often small size of the flaps.

Figure 1:
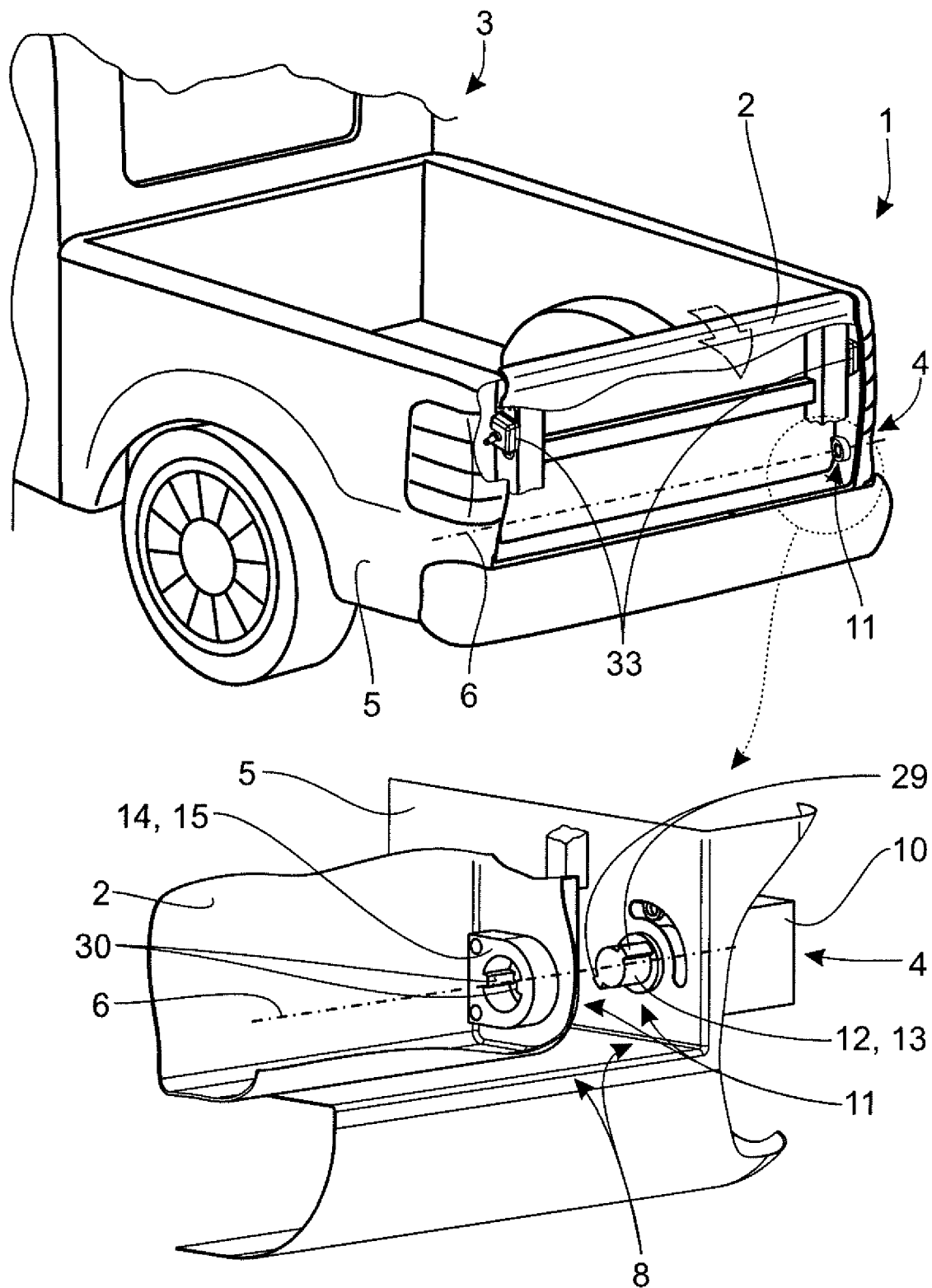
FIG. 1 shows a motor vehicle with the proposed flap arrangement comprising a proposed drive arrangement.

FIG. 1 shows a flap arrangement 1 with a flap 2 for a motor vehicle 3 and with at least one drive arrangement 4 for adjusting the flap 2. In the shown mounted state, the flap 2 is mounted on a body 5 of the motor vehicle 3 to be pivotable about a flap pivot axis 6. The flap 2 can be adjusted between an open position shown in FIG. 3b) and a closed position shown in FIGS. 1 and 3a) over a pivot angle α.

Presently, the expression "flap" is to be understood in a broad sense. It includes any kind of pivotable doors of a motor vehicle 3 such as tailgates, liftgates, trunk lids, back doors, front hoods, side doors or the like. In the preferred embodiment, the flap 2 is designed as a pick-up tailgate, which opens downwards in the direction of the gravity.

The drive arrangement 4 includes an electrical motor 7 for generating and transmitting driving forces to adjust the flap 2. The motor 7 is shown in FIG. 2b). The drive arrangement 4 also includes a drive train 8, which is a series of mechanical components between the motor 7 and the flap 2, as shown, or the body 5 of the motor vehicle 3, an alternative not shown but equally preferred, for transmitting the driving forces.

Figure 2:
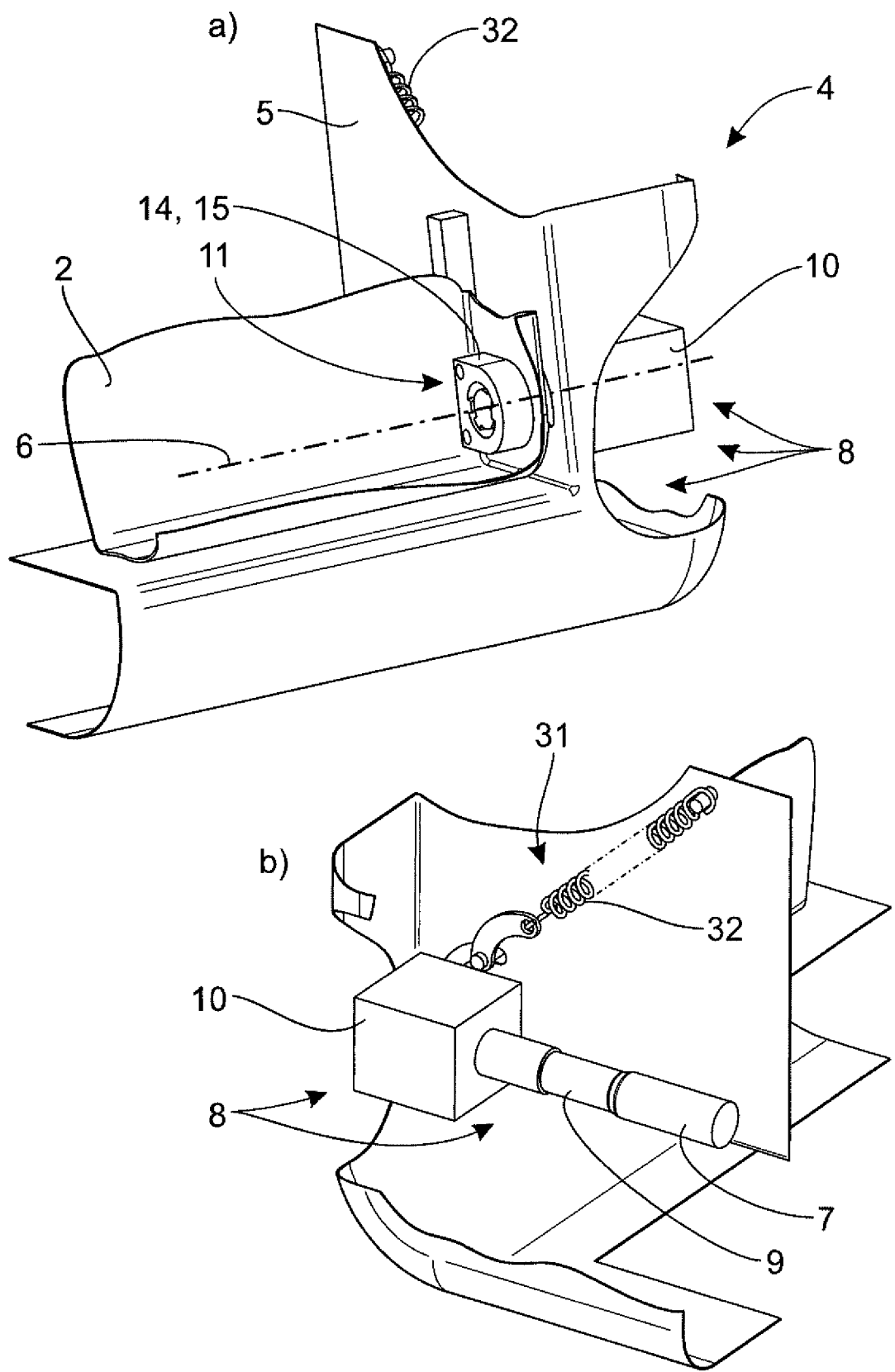
FIG. 2 shows a detail of the proposed flap arrangement from two different perspectives.

The drive train 8 may include at least one gear 9, 10. As an example, as shown in FIG. 2. the drive train 8 includes a reduction gear 9 and an angular gear 10. The reason for the angular gear 10, in this case, is, that the motor 7 is here and preferably located on the body 5 of the motor vehicle 3. The motor 7 may be an elongated motor the available space in the body 5 of the motor vehicle 3 can be better used if the motor 7 is aligned orthogonal to the flap 2. This embodiment, however, is not to be understood as limiting the invention. As an example, the motor 7 may also be arranged inside the flap 2.

As an example, the drive train 8 includes a freewheel mechanism 11. The freewheel mechanism 11 includes a drive component 12, such as a drive shaft, with at least one force transmitting element 13, and a driven component 14, such as a driven shaft, with at least one force receiving element 15 assigned to a respective transmitting element 13.

FIG. 1 shows the freewheel mechanism 11 in a disassembled state when the flap 2 is not mounted to the body 5 of the motor vehicle 3. FIG. 2a) shows the freewheel mechanism 11 in an assembled state.

Figure 3:
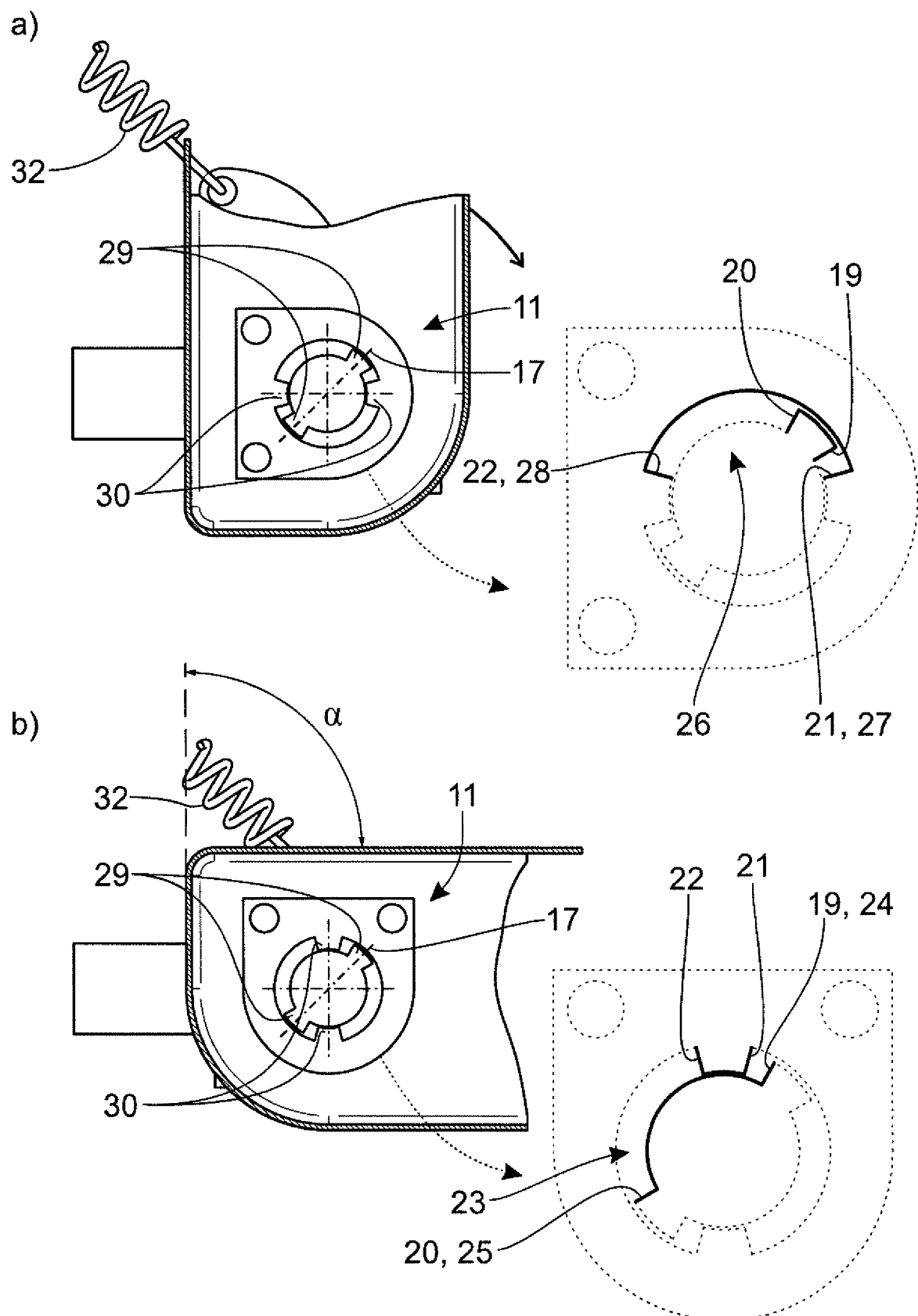
FIG. 3 shows schematically the open position of the flap in a) and the closed position of the flap in b) while the transmitting element is in the neutral position and FIG. 4 shows schematically the motorized opening and closing of the flap.
Figure 4:
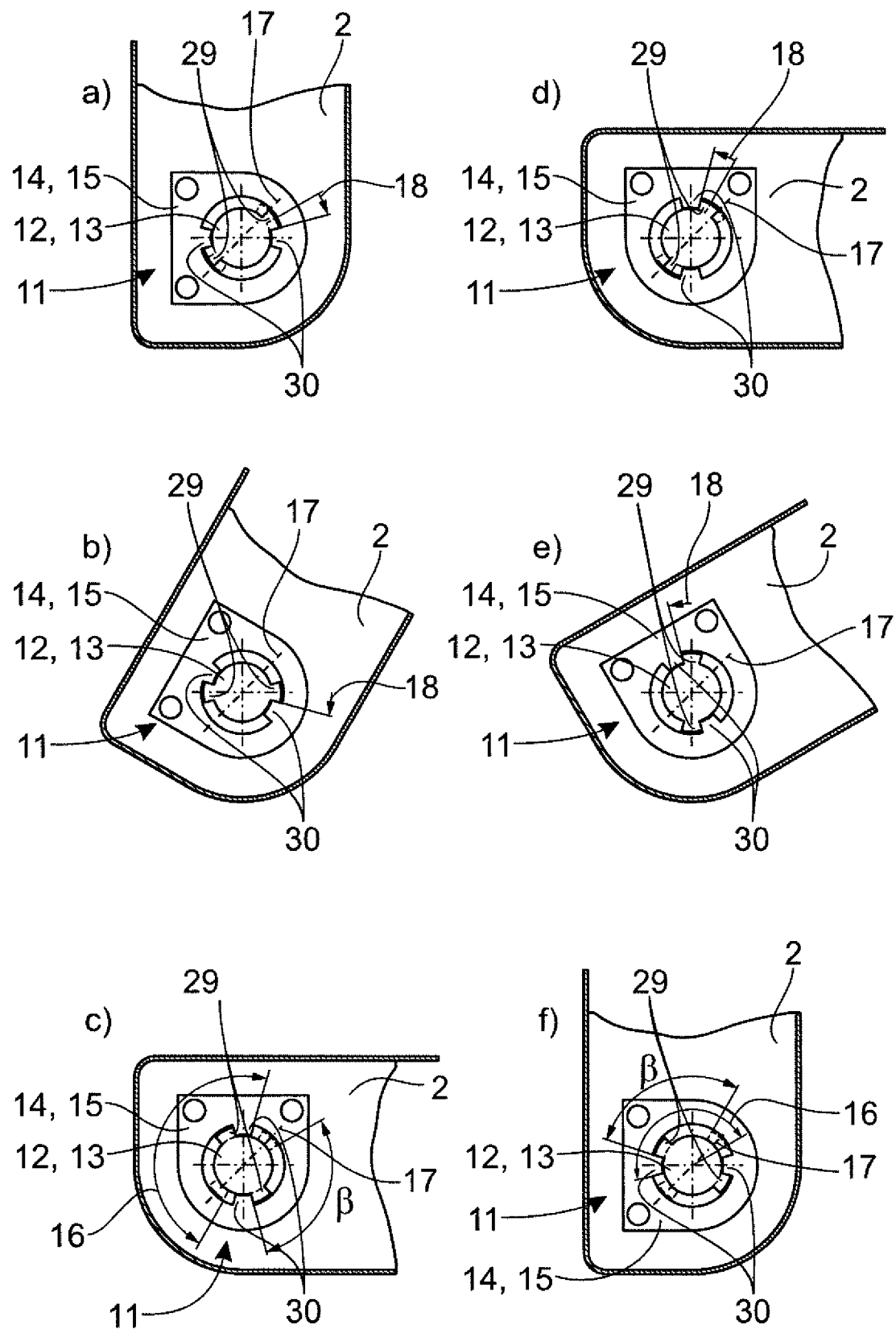

The functioning of the freewheel mechanism 11 can be seen in FIGS. 3 and 4. During a motorized movement of the flap 2 from its closed to its open position (from FIG. 3a) to FIG. 3b)) and or from its open to its closed position (from FIG. 4b) to FIG. 4a)) over at least part of the pivot angle α the motor 7 actuating, such as rotating, the drive component 12 displaces the transmitting element 13 together with the receiving element 15 along a displacement path 16. The motorized movement is shown schematically in FIG. 4.

The motorized movement of the transmitting element 13 starts from a neutral position 17 shown in FIG. 3 and in dashed lines in FIG. 4. While the details of the freewheel mechanism 11 will be discussed in depth later, the general concept of the motorized opening and closing can be seen in FIG. 4. From FIG. 4a) to FIG. 4c), starting from the neutral position 17, the transmitting element 13 turns clockwise, engaging the receiving element 15 in a manner yet to be described and turning the receiving element 15 clockwise until reaching the opening position shown in FIG. 4c), thereby moving the flap 2.

After the motorized movement of the flap 2, the transmitting element 13 can be displaced back to the neutral position 17 independent of the flap 2. As an example, the transmitting element 13 is displaced back to the neutral position 17 after every motorized movement into at least the fully open and/or the fully closed position of the flap 2. The motoring closing of the flap from FIG. 4d) to FIG. 4f) therefore may start again from the neutral position 17 in FIG. 4d). By turning the transmitting element 13 counter-clockwise the receiving element 15 and with it, the flap 2, may reach the fully closed position in FIG. 4f).

As can be seen in FIG. 3, when the transmitting element 13 is in the neutral position 17, during a manual movement of the flap 2 from its closed to its open position and/or from its open position to its closed position over at least part of pivot angle α the flap 2 by actuating, such as rotating, the driven component 14 displaces the receiving element 15 along the displacement path 16 in the direction of the neutral position 17 of the force transmitting element 13 without displacing, such as without engaging, the transmitting element 13. It is directly obvious from FIG. 3 that the flap 2 can be displaced over the full 90° of the pivot angle α without the receiving element 15 coming into contact with the transmitting element 13.

As an example, the motorized movement is a, preferably complete, motorized opening and/or a, preferably complete, motorized closing of the flap 2. In one or more embodiments, the flap 2 can be opened and closed completely motorized. Additionally or alternatively the manual movement is a, preferably complete, manual opening and/or a, preferably complete, closing of the flap 2.

Here as an example the flap 2 and the motor 7 displace the receiving element 15 along the exact same part of the displacement path 16 during the manual opening and the motorized opening respectively. Additionally or alternatively, the flap 2 and the motor 7 displace the receiving element 15 along the exact same part of the displacement path 16 during the manual closing and the motorized closing respectively. As an example, the flap 2 and the motor 7 displace the receiving element 15 along the displacement path 16 in a first direction (clockwise) during the manual and motorized opening and along the displacement path 16 in a second direction opposite to the first direction during the manual and motorized closing (counter-clockwise).

As can be seen in the figs. the displacement path 16 is here and preferably a circular path. In the preferred embodiment, the displacement path 16 goes circularly around a geometrical axis, here and preferably the geometrical flap pivot axis 6, for the complete 360°. However, as shown, the transmitting element 13 and the receiving element 15 exhibit a symmetrical design. As will be described later, it is also possible to have a different design which would not use the complete 360°. For this reason, in FIGS. 4c) and f) the displacement path, once for opening and once for closing, is only shown for one side of the transmitting and receiving elements 13, 15.

It may be the case that the motor 7 rotates the drive component 12 and the driven component 14 each around the geometrical axis, preferably the same geometrical axis and/or the flap pivot axis 6, during the motorized movement, and/or, that the flap 2 rotates the driven component 14 around the geometrical axis of the drive component 12 during the manual movement.

Here as an example, the transmitting element 13 is fixedly coupled to the drive component 12. Alternatively, the drive component 12 and the transmitting element 13 are one piece. Additionally or alternatively the receiving element 15 is fixedly coupled to the driven component 14 or the driven component 14 and the transmitting element 15 are one piece. In the preferred and shown embodiment, the elements 13, 15 and respective components 12, 14 are one piece each.

In the neutral position 17, for example, the transmitting element 13 is load-free. The flap 2 does not provide any load on the transmitting element 13 in the neutral position 17. In one or more embodiments, in the neutral position 17 the transmitting element 13 is not in engagement with the receiving element 15. It may be the case that at the beginning of the motorized opening and/or closing the transmitting element 13 comes into engagement with the receiving element 15, such as after passing over a short distance 18. As an example, the drive train 8 only transmits the driving forces from the motor 7 to the flap 2 or the body 5 of the motor vehicle 3 when the transmitting element 13 and receiving element 15 are in engagement. The engagement may be a direct or an indirect engagement. As an example, there may be another component between the transmitting element 13 and the receiving element 15, for example, a dampening component. Then the transmitting element 13 and the receiving element 15 would only be in indirect engagement, different from the direct engagement shown in the figs.

As has already been hinted, not the complete shown transmitting and receiving elements 13, 15 are necessary to provide the first function of the present teaching. This is shown schematically in FIG. 3 on the right where the functioning of the present teaching can be seen in two alternative sketches which will be described in more detail now.

Here, as an example, the transmitting element 13 includes a transmitting opening contour 19 and a transmitting closing contour 20. The receiving element 15 may comprise a receiving opening contour 21 and a receiving closing contour 22. As an example, each of these contours 19-22 is present on the respective element 13, 15 twice. This can be seen by looking at the sketches in FIG. 3, where the contours 19-22 are marked differently between the top sketch and the bottom sketch without changing the underlying design of the transmitting and receiving elements 13, 15.

During the motorized opening the transmitting and receiving opening contours 19, 21 are here and preferably in engagement with each other and the transmitting and receiving closing contours 20, 22 are not in engagement with each other. During the motorized closing the transmitting and receiving closing contours 20, 22 may be in engagement with each other, while the transmitting and receiving opening contours 19, 21 are not in engagement with each other. As an example, during the manual opening the closing and opening contours 19, 21 are not in engagement with each other. As an example, during the manual opening and closing the opening contours 19, 21 and the closing contours 20, 22 are not in respective engagement with each other when the transmitting element is in the neutral position 17.

Here, as an example, the transmitting element 13 forms an open space 23 for the receiving element 15. This is shown in the bottom right sketch of FIG. 3. The open space 23 is limited by a first wall 24 and by second wall 25. As an example, the first wall 24 is the transmitting opening contour 19 and the second wall 25 is the transmitting closing contour 20. The receiving opening contour 21 and the receiving closing contour 22 may run in the open space 23.

It may be the case that during the motorized movement the motor 7 displaces the open space 23 with the transmitting element 13, such as radially around the geometrical axis of the drive component 12, and causally by displacing the open space 23 displaces the receiving element 15. As an example, during the manual movement, the flap 2 displaces the receiving element 15 relative to the opening space 23, such as displaces the receiving opening and/or closing contour 21, 22 in the open space 23, without displacing the open space 23 when the transmitting element 13 is in the neutral position 17.

As the top right sketch of FIG. 3 shows the receiving element 15 may form an open space 26 for the transmitting element 13. As can be seen, the transmitting element 13 and the receiving element 15 each form an open space 23, 26. The open space 26 of the receiving element 15 is also limited by a first wall 27 and by a second wall 28. As an example, the first wall 27 is the receiving opening contour 21 and the second wall 28 is the receiving closing contour 22. The transmitting opening contour 19 and the transmitting closing contour 20 may run in the open space 26. During the motorized movement, the motor 7 displaces the transmitting element 13, for example radially around the geometrical axis of the drive component 12, and causally by displacing the transmitting element 13 displaces the open space 26. During the manual movement, the flap 2 may displace the open space 26, without displacing the transmitting element 13 when the transmitting element 13 is in the neutral position 17.

With hindsight to FIGS. 1 and 2 it can be seen that the drive component 12 and the driven component 14 are driveshafts rotatable around a geometrical axis, here and preferably the geometrical flap pivot axis 6. One of the transmitting element 13 and the receiving element 15 can be a disk shaped element and the other a hollow disk shaped element that may partially face each other and here and for example, overlap in axial direction. In the case shown in the figures, the drive component 12 is the disk shaped element and the driven component 14 is the hollow disk shaped element. As can also be seen, the disk-shape relates to the cross-section necessary for the functioning of the freewheel mechanism 11. As an example the hollow disk shaped element is arranged radially partially or completely around the disk shaped element.

Here, as an example, the drive component 12 includes at least one, preferably two, cam elements 29 extending radially from its geometrical axis towards the driven component 14. Additionally or alternatively the disk shaped element may include at least one cam element 29 which may then extend radially from its geometrical axis towards the hollow disk shaped element.

The driven component 14 and/or the hollow disk shaped element may include one, or two, cam elements 30 extending inwards towards its geometrical axis and/or towards the disk shaped element respectively. As an example, there are at least two cams 29, 30 on the disk shaped elements or the hollow disk shaped element.

The cam elements 29, 30 may include the transmitting and receiving opening and closing contours 19-22. As an example, the cam elements 29 of the drive component 12 and/or the disk-shape element include the transmitting opening and closing contours 19, 20 and the cam elements 30 of the driven component 14 and/or the hollow disk shaped element may include the receiving opening and closing contours 21, 22.

During contact between the opening and closing contours 19-22 during the motorized movement the contours may run parallel to each other, thereby being in contact with each other over an area, such as the complete area, of the respective contour 19-22.

Here as an example, the cams 30, in this case at least two cams 30, of the driven component 14 and/or the hollow disk shaped element form the open space 23 of the receiving element 15 or the transmitting element 13 and/or the cams 29, in this case at least two cams 30, of the drive component 12 and/or the disk shaped element form the open space 26 of the receiving element 15 or the transmitting element 13.

With regards to FIG. 3 the flap 2 and the motor 7 respectively may displace the receiving element 15, such as the receiving opening and closing contours 21, 22, during the manual and/or motorized movement of the flap 2 along the circular displacement path 16 over a freewheel angle β. The freewheel angle β is, here and may be, the pivot angle α multiplied with a factor. In one or more embodiments the factor is smaller than or equal to 4, or smaller that or equal to 2, or exactly 1 and/or greater than or equal to 0.25, or greater than or equal to 0.5. The pivot angle α and/or the freewheel angle β are here and may be greater than 45', or greater than 70° or more or less equal to 90° and/or, smaller than 135°, or smaller than 110°.

Here as an example, the open space 23, 26 allows a displacement of the receiving element 15 greater than the actual displacement of the receiving element 15 during any intended movement of the flap 2. For example, the open space 23, 26 may have an angular width of 160° while the freewheel angle β may be 90°.

The drive arrangement 4 may further include a spring arrangement 31 comprising a spring 32 connected to the flap 2 and the motor vehicle body 5. The spring 32 may generate and transfer driving forces to the flap 2, such as against a gravity direction.

As the freewheel mechanism 11 allows free movement of the flap 2 even during the motorized movement in the same direction as the motorized movement, in the preferred embodiment, it may be the case that in the load-free and non-motor actuated state of the flap 2 the driving forces of the spring 32 and the gravity forces acting on the flap 2 are balanced such that the flap 2 remains in at least the open position and/or the closed position. In this way, the flap 2 won't move out of its own accord and especially will not fall down to the open position. As an example, the flap 2 is balanced in any position. To achieve this, a brake, a friction arrangement or a dampener arrangement could be provided in addition to the spring 32, too. The spring 32 also allows using a smaller motor 7 because the motor 7 does not have to move the complete weight of the flap 2.

As is also shown in FIG. 1, the flap arrangement 1 may be provided with at least one motor vehicle lock 33 such as to hold the flap 2 in its closed position.

According to another embodiment, a drive arrangement 4 is provided. The drive arrangement 4 of the second teaching can be used in the flap arrangement 1 of the first teaching. All explanations given with respect to the first teaching are fully applicable to the second teaching.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 1 flap arrangement
2 flap
3 motor vehicle
4 drive arrangement
5 motor vehicle body
6 flap pivot axis
7 electrical motor
8 drive train
9 reduction gear
10 angular gear
11 freewheel mechanism
12 drive component
13 transmitting element
14 component
15 transmitting element
16 displacement path
17 neutral position
18 short distance
19 opening contours
20 closing contours
21 opening contour
22 closing contour
23 open space
24 first wall
25 second wall
26 open space
27 first wall
28 second wall
29 cam elements
30 cam elements
31 spring arrangement
32 spring
33 one motor vehicle lock While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A flap arrangement for use in a motor vehicle provided with a body and a flap pivotable about a geometrical flap pivot axis between an open position and a closed position over a pivot angle (α), the flap arrangement comprising:
 a drive arrangement configured to adjust the flap, and including an electrical motor, configured to generate and transmit driving forces to adjust the flap; and
 a drivetrain disposed between the motor and the flap or between motor and the body of the motor vehicle and configured to transmit the driving forces, wherein the drivetrain includes,
  a freewheel mechanism provided with a driveshaft, a force transmitting element, and a driven component provided with a force receiving element coupled to a respective transmitting element, wherein
  during a motorized movement of the flap between the closed position and the open position over at least a portion of the pivot angle (α), the motor rotates the drive component and displaces the transmitting element, from a neutral position, and displaces the receiving element along a displacement path,
  after the motorized movement of the flap, the transmitting element is configured to be displaced back to the neutral position independent of a position of the flap,
  wherein in response to the transmitting element being in the neutral position and a manual movement of the flap between the closed position and the open position over at least part of the pivot angle (α), the flap rotates the driven component to displace the receiving element along the displacement path towards the neutral position without engaging the transmitting element.

2. The flap arrangement of claim 1, wherein during the motorized movement of the flap and or during the manual movement of the flap, the flap moves along the entire pivot angle.

3. The flap arrangement of claim 1, wherein during manual movement of the flap towards the open position and during motorized movement of the flap towards the open position, the motor and the flap each displace the receiving element along a common portion of the displacement path.

4. The flap arrangement of claim 3, during manual movement of the flap towards the closed position and during motorized movement of the flap towards the closed position, the flap and the motor each displace the receiving element along the displacement path in a first direction and during manual movement of the flap towards the open position and motorized movement of the flap towards the open position, the flap and the motor each displace the receiving element along the displacement path in a second direction, opposite to the first direction.

5. The flap arrangement of claim 1, wherein the displacement path is circular.

6. The flap arrangement of claim 5, wherein during manual movement of the flap, the flap displaces the receiving element defining a receiving opening and including closing contours along the displacement path at a freewheel angle ($\beta$), and during motorized movement of the flap, the motor displaces the receiving element defining the receiving opening and including the closing contours along the displacement path at the freewheel angle ($\uparrow$), and wherein the freewheel angle ($\uparrow$) is equal to the pivot angle ($\alpha$) multiplied by a factor that is less than or equal to 4.

7. The flap arrangement of claim 6, wherein the factor is greater than or equal to 0.5.

8. The flap arrangement of claim 1, wherein the transmitting element is fixedly coupled to the drive component, the drive component and the transmitting element are formed as one piece, the receiving element is fixedly coupled to the driven component, or the driven component and the transmitting element are formed as one piece.

9. The flap arrangement of claim 1, wherein in response to the transmitting element being in the neutral position, the transmitting element is load-free and disengaged from the receiving element, and at a beginning of a motorized opening and/or a motorized closing of the flap, the transmitting element engages the receiving element and the drivetrain only transmits the driving forces from the motor to the flap or to the body of the motor vehicle in response to the transmitting element engaging the receiving element.

10. The flap arrangement of claim 9, wherein the transmitting element includes a transmitting opening contour and a transmitting closing contour, and the receiving element includes a receiving opening contour and a receiving closing contour, wherein during the motorized opening of the flap, the transmitting opening contour and the receiving opening contour are engaged to each other and the transmitting closing contour and the receiving closing contour are disengaged from each other, and during the motorized closing of the flap, the transmitting closing contour and the receiving closing contour are engaged with each other and the transmitting opening contour and the receiving opening contour are disengaged from each other, and wherein when the transmitting element is in the neutral position and during manual movement of the flap, the transmitting opening contour and the receiving opening contour are disengaged from each other and the transmitting closing contour and the receiving closing contour are disengaged from each other.

11. The flap arrangement of claim 1, wherein the transmitting element forms an open space limited by a first wall and a second wall and configured to receive at least a portion of the receiving element, wherein the first wall is the transmitting opening contour and the second wall is the transmitting closing contour, and the receiving opening contour and the receiving closing contour each move within the open space, wherein during the motorized movement of the flap, the motor displaces the open space and the transmitting element radially about an axis, defined by the drive component, to displace the receiving element, and/or during the manual movement of the flap and when the transmitting element is in the neutral position, the flap displaces the receiving element relative to the open space, without displacing the open space.

12. The flap arrangement of claim 11, wherein the open space allows the receiving element to displace by a displacement that is greater than an actual displacement of the receiving element during manual movement and motorized movement of the flap.

13. The flap arrangement of claim 1, wherein the receiving element forms an open space limited by a first wall and by a second wall and configured to receive at least a portion of the transmitting element, wherein the first wall is the receiving opening contour, the second wall is the receiving closing contour, and the transmitting opening contour and the transmitting closing contour move within the open space, wherein during the motorized movement of the flap, the motor displaces the transmitting element radially about the an axis defined by the drive component to displace the transmitting element to displace the open space, and/or during the manual movement the flap and when the transmitting element is in the neutral position, the flap displaces the open space.

14. The flap arrangement of claim 1, wherein the drive component is a first drive shaft rotatable about a first geometrical axis and the driven component is a second drive shaft rotatable about a second geometrical axis, wherein either the transmitting element or the receiving element is a disk shaped element and the other of the transmitting element or the receiving element is a hollow disk shaped element, and the disk shaped element and the hollow disk shaped element at least partially face each other, and the hollow disk shaped element is arranged to at least partially radially surround the disk shaped element.

15. The flap arrangement of claim 1, wherein the drive component includes a first cam element extending radially from a first axis defined by the drive component towards the driven component, and the driven component includes a second cam element extending inwardly towards a second axis defined by the driven component and wherein the first cam element and the second cam element collectively define the transmitting opening contour, the transmitting closing contour, the receiving opening and the receiving closing contour.

16. The flap arrangement of claim 1, wherein the second cam forms an open space defined by either the receiving element or the transmitting element and/or the first cam forms the open space defined by either the transmitting element or the receiving element.

17. The flap arrangement of claim 1, further comprising a spring arrangement provided with a spring connected to the flap and the body of the motor vehicle and configured to generate and transfer driving forces to the flap such that the flap is held stationary in one or more positions between and including the open position and the closed position.

18. A drive arrangement configured to pivot a tailgate, pivotally coupled to a vehicle body, between an open position and a closed position, the drive arrangement comprising:
- a freewheel mechanism configured to be fixed to the tailgate and defining an opening provided with an inner periphery that includes a first cam element and a second cam element;
- a drive shaft configured to be rotatably coupled to the vehicle body and extending into the opening, wherein the drive shaft defines an outer periphery that includes a third cam element and a fourth cam element; and
- a motor coupled to the drive shaft and configured to rotate the drive shaft so that the third cam element engages the first cam element to pivot the tailgate from the closed position towards the open position.

19. The drive arrangement of claim 18, wherein when the drive shaft is in a neutral position, the first and second cam elements are each spaced apart from the third and fourth cam elements so that as the tailgate is manually moved between the open position and the closed position, the drive shaft remains in the neutral position.

20. A drive arrangement configured to pivot a tailgate, pivotally coupled to a vehicle body, between an open position and a closed position, the drive arrangement comprising:
- a freewheel mechanism configured to be rotatably coupled to the vehicle body and defining an opening provided with an inner periphery that includes a first cam element and a second cam element;
- a drive shaft configured to be fixed to vehicle body and extending into the opening, wherein the drive shaft defines an outer periphery that includes a third cam element and a fourth cam element; and
- a motor coupled to the freewheel mechanism and configured to rotate the freewheel mechanism so that the first cam element engages the third cam element to pivot the tailgate from the closed position towards the open position.

* * * * *